United States Patent
Phan et al.

(10) Patent No.: US 11,797,423 B2
(45) Date of Patent: *Oct. 24, 2023

(54) EXPERIMENT PLATFORM ENGINE

(71) Applicant: COUPANG CORP., Seoul (KR)

(72) Inventors: Ngoc-Lan Isabelle Phan, Burlingame, CA (US); Jun Ye, Fremont, CA (US); Beibei Ye, Fremont, CA (US); Chul Seo, San Carlos, CA (US)

(73) Assignee: COUPANG CORP., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/380,152

(22) Filed: Jul. 20, 2021

(65) Prior Publication Data

US 2022/0066913 A1    Mar. 3, 2022

Related U.S. Application Data

(63) Continuation of application No. 17/005,834, filed on Aug. 28, 2020, now Pat. No. 11,232,018.

(51) Int. Cl.
*G06F 11/00* (2006.01)
*G06F 11/36* (2006.01)
(Continued)

(52) U.S. Cl.
CPC ...... *G06F 11/3672* (2013.01); *G06F 11/3664* (2013.01); *G06F 11/3684* (2013.01);
(Continued)

(58) Field of Classification Search
None
See application file for complete search history.

(56) References Cited

U.S. PATENT DOCUMENTS 10,178,043 B1 * 1/2019 Ganjam ............... H04L 65/764
10,387,787 B1   8/2019 Cessna et al.
(Continued)

FOREIGN PATENT DOCUMENTS

CN    104348679 A    2/2015
CN    108182140 A    6/2018
(Continued)

OTHER PUBLICATIONS

Capra, M. G. (2006). Usability problem description and the evaluator effect in usability testing (Order No. 3207958). Available from ProQuest Dissertations and Theses Professional. (304961217). Retrieved from https://dialog.proquest.com/professional/docview/304961217?accountid=131444 (Year: 2006).*
(Continued)

*Primary Examiner* — Gurkanwaljit Singh
(74) *Attorney, Agent, or Firm* — FINNEGAN HENDERSON FARABOW, GARRETT & DUNNER LLP

(57) ABSTRACT

A computerized method for controlled testing, comprising: providing a design specification for event data, the design specification including at least one of an event data source, an event data filter, and an event format; retrieving testing metrics; configuring testing events based on the design specification, by: retrieving testing events from the event data source specified in the design specification; filtering the retrieved testing events based in the design specification; and formatting the filtered testing events based on the design specification; generating analysis data by applying testing metrics to the configured event data; generating output data based on testing rules; and generating a user interface to display the output data.

20 Claims, 10 Drawing Sheets

(51) Int. Cl.
  *G06Q 30/0201* (2023.01)
  *G06F 16/248* (2019.01)
  *G06F 16/245* (2019.01)

(52) U.S. Cl.
  CPC ........ *G06F 11/3688* (2013.01); *G06F 16/245* (2019.01); *G06F 16/248* (2019.01); *G06Q 30/0201* (2013.01)

(56) References Cited

U.S. PATENT DOCUMENTS

| | | | | |
|---|---|---|---|---|
| 10,431,208 B2* | 10/2019 | Miller | .................. | G06F 40/186 |
| 10,706,454 B2* | 7/2020 | Li | ...................... | G06Q 30/0633 |
| 10,733,078 B2* | 8/2020 | Mordo | .................... | G06F 8/34 |
| 10,733,086 B2* | 8/2020 | Kharitonov | ......... | G06F 11/3684 |
| 10,797,960 B2* | 10/2020 | Zavesky | ................ | H04L 41/16 |
| 2012/0054095 A1* | 3/2012 | Lesandro | ................ | G06F 9/452 |
| | | | | 705/39 |
| 2012/0069131 A1* | 3/2012 | Abelow | ............. | G06Q 30/0601 |
| | | | | 345/589 |
| 2014/0282049 A1* | 9/2014 | Lyon | ..................... | G06F 3/0484 |
| | | | | 715/744 |
| 2016/0225063 A1* | 8/2016 | Wical | ................ | G06Q 30/0631 |
| 2017/0178199 A1* | 6/2017 | Cessna | ............... | G06Q 30/0201 |
| 2018/0349258 A1* | 12/2018 | Kharitonov | ......... | G06F 11/3692 |
| 2019/0066664 A1* | 2/2019 | Miller | .................. | G10L 19/018 |
| 2019/0199599 A1 | 6/2019 | Zavesky et al. | | |
| 2019/0303995 A1* | 10/2019 | Li | ...................... | G06Q 30/0633 |
| 2020/0104398 A1 | 4/2020 | Ivaniuk et al. | | |

FOREIGN PATENT DOCUMENTS

| | | |
|---|---|---|
| CN | 111190825 A | 5/2020 |
| JP | 2009064430 A | 3/2009 |
| JP | 2017021406 A | 1/2017 |
| KR | 20100069147 A | 6/2010 |
| KR | 20140053542 A | 5/2014 |
| KR | 102145821 B1 | 8/2020 |

OTHER PUBLICATIONS

Puranik, R. (2012). A study of internet users' perception towards internet advertising (Order No. 27535266). Available from ProQuest Dissertations and Theses Professional. (2314597070). Retrieved from https://dialog.proquest.com/professional/docview/2314597070?accountid=131444 (Year: 2012).*

Louviere, Jordan J., and David A. Hensher. "Using Discrete Choice Models with Experimental Design Data to Forecast Consumer Demand for a Unique Cultural Event." Journal of Consumer Research 10.3 (1983). (Year: 1983).*

Boehm, Barry W. "Verifying and validating software requirements and design specifications." IEEE Software. 1984. (Year: 1984).*

Kirk, Roger E. "Experimental design." Handbook of Psychology, Second Edition (2012).

Bhat, Nikhil, V. Farias, and C. Moallemi. Optimal ab testing. Working paper, 2015.

Louviere, Jordan J., and David A. Hensher. "Using Discrete Choice Models with Experimental Design Data to Forecast Consumer Demand for a Unique Cultural Event." Journal of Consumer Research 10.3 (1983).

Boehm, Banry W. "Verifying and validating software requirements and design specifications." IEEE Software. 1984.

International Search Report and Written Opinion dated May 24, 2021 issued in International Application No. PCT/IB2021/050634, 9 pages.

Examination Notice in counterpart Hong Kong Application No. 22021030798.3 dated May 20, 2022 (7 pages).

Taiwan Office Action in counterpart Taiwanese Patent Application No. 110100045 dated Jul. 14, 2022 (20 pages).

Notice of Allowance issued by the Korean Patent Office in related Application No. 10-2020-0177871, dated Nov. 4, 2021.

Examination Notice in counterpart Hong Kong Application No. 22021030798.3 dated Jul. 11, 2023 (7 pages).

* cited by examiner

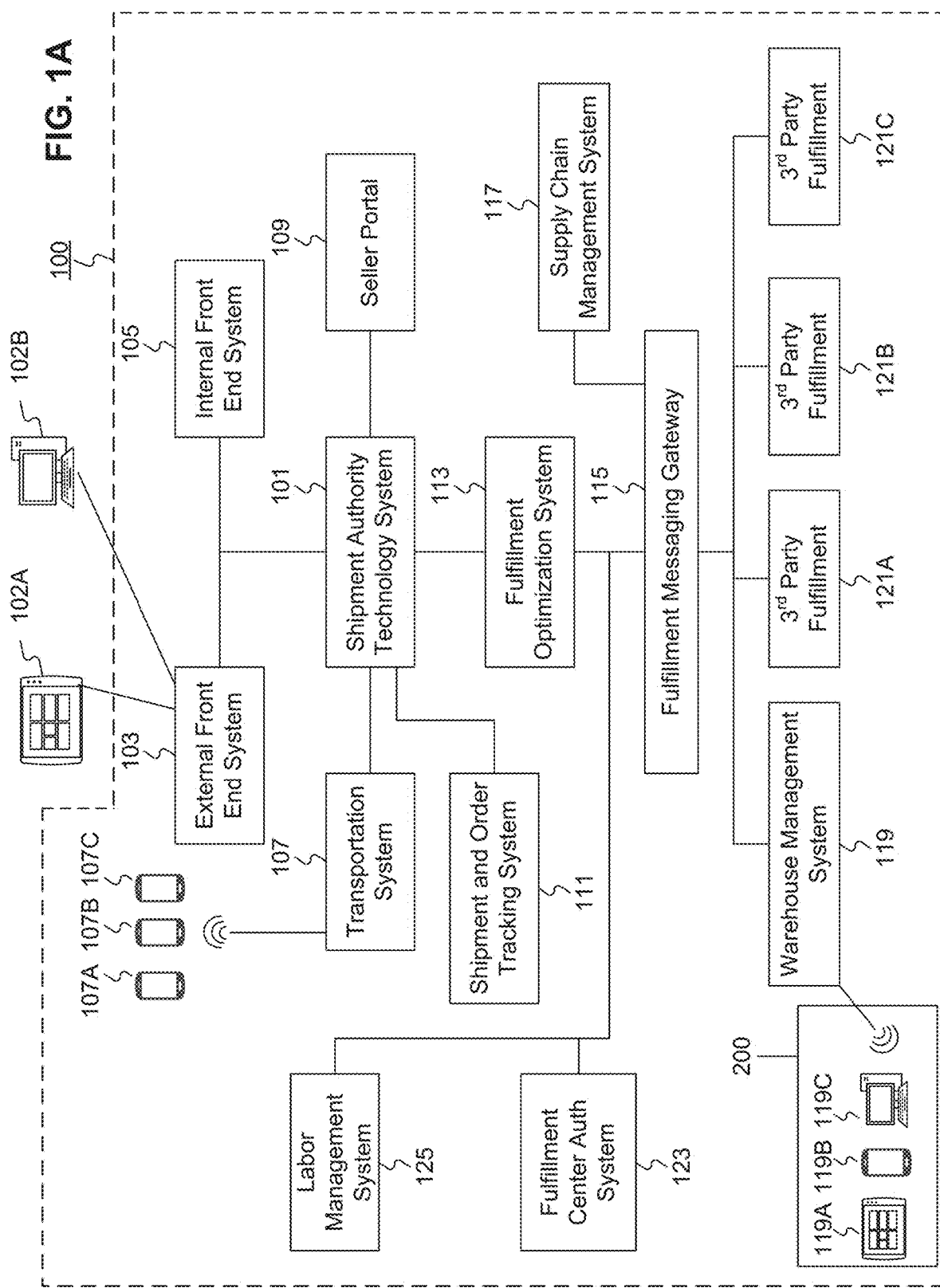

EXPERIMENT PLATFORM ENGINE

CROSS-REFERENCE TO RELATED APPLICATIONS

This application is a continuation of U.S. application Ser. No. 17/005,834, filed Aug. 28, 2020, now allowed, which is incorporated herein by reference in its entirety.

TECHNICAL FIELD

The present disclosure generally relates to computerized systems and methods for an experiment platform engine. In particular, embodiments of the present disclosure relate to inventive and unconventional systems used for the configuration and computation of metrics required to interpret the results of A/B tests.

BACKGROUND

A/B testing, also known as "randomized controlled experiment", is a methodology for improving processes, often relating with user experiences of computer systems. Resulting data obtained from this methodology may be used to improve various technical aspects of the computer systems to allow for quicker operation, easier use, reduced errors rate, optimized user interfaces, and other enhancements to the user satisfaction of the computer systems.

One aspect of A/B testing is the processing of the data to obtain useful results. For a given system, or among several systems, numerous A/B tests may be designed for each operation or sub-system. Each test may in turn generate different types of data, which may in some cases require different processing. An experiment platform engine may be utilized to process and analyze these data to obtain the useful results.

Existing experiment platform engines may be limited in configurability, processing speed and throughput, thus reducing the overall capability and utility. In some instances, one A/B test may differ significantly from another A/B test, thus one experiment platform engine may be ill suited to analyze data of both A/B tests without extensive customization. Even for related A/B tests, minor variations may require modification to the experiment platform engine, which may cause delay to the overall system operation. Delays may reduce the throughput of the experiment platform engines such that the overall number of tests and data being conducted and processed are less than optimal.

Therefore, there is a need for improved methods and systems to implement experiment platform engine.

SUMMARY

One aspect of the present disclosure is directed to a computerized method for controlled testing, comprising: providing a design specification for event data, the design specification including at least one of an event data source, an event data filter, and an event format; retrieving testing metrics; configuring testing events based on the design specification, by: retrieving testing events from the event data source specified in the design specification; filtering the retrieved testing events based in the design specification; and formatting the filtered testing events based on the design specification; generating analysis data by applying testing metrics to the configured event data; generating output data based on testing rules; and generating a user interface to display the output data.

Another aspect of the present disclosure is directed to a method for controlled testing, comprising: an user interface; a memory storing instructions; and at least one processor configured to execute the instructions to perform operations comprising: providing a design specification for event data via the user interface, the design specification including at least one of an event data source, an event data filter, and an event format; retrieving testing metrics; configuring testing events based on the design specification, by: retrieving testing events from the event data source specified in the design specification; filtering the retrieved testing events based in the design specification; and formatting the filtered testing events based on the design specification; generating analysis data by applying testing metrics to the configured event data; generating output data based on testing rules; and displaying the output data on the user interface.

Yet another aspect of the present disclosure is directed to a system platform for controlled testing, comprising: a user interface display; one or more database; one or more memory storing computer readable instruction; and at least one processor configured to execute the stored instructions to perform the step of: providing a design specification in form of a standardized design document specifying: at least one of event data source, an event data filter, and an event format; one or more testing metric sources; and one or more testing rule sources; retrieving testing metrics from the designated testing source stored in the one or more database; configuring testing events based on the design specification by: retrieving testing events from the event data source stored in the one or more database; filtering the retrieved testing events based on at least one of a testing period, testing region, or an event data type; and formatting the filtered testing events based on one or more event data format rules based on the design specification; generating analysis data by applying testing metric to the configured event data; generating output data based on testing rules; and generating the user interface to display the output data.

Other systems, methods, and computer-readable media are also discussed herein.

BRIEF DESCRIPTION OF THE DRAWINGS

FIG. 1A is a schematic block diagram illustrating an exemplary embodiment of a network comprising computerized systems for communications enabling shipping, transportation, and logistics operations, consistent with the disclosed embodiments.

DETAILED DESCRIPTION

Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for analyzing results data of controlled testing.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
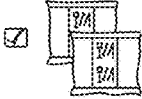
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or 3$^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3$^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
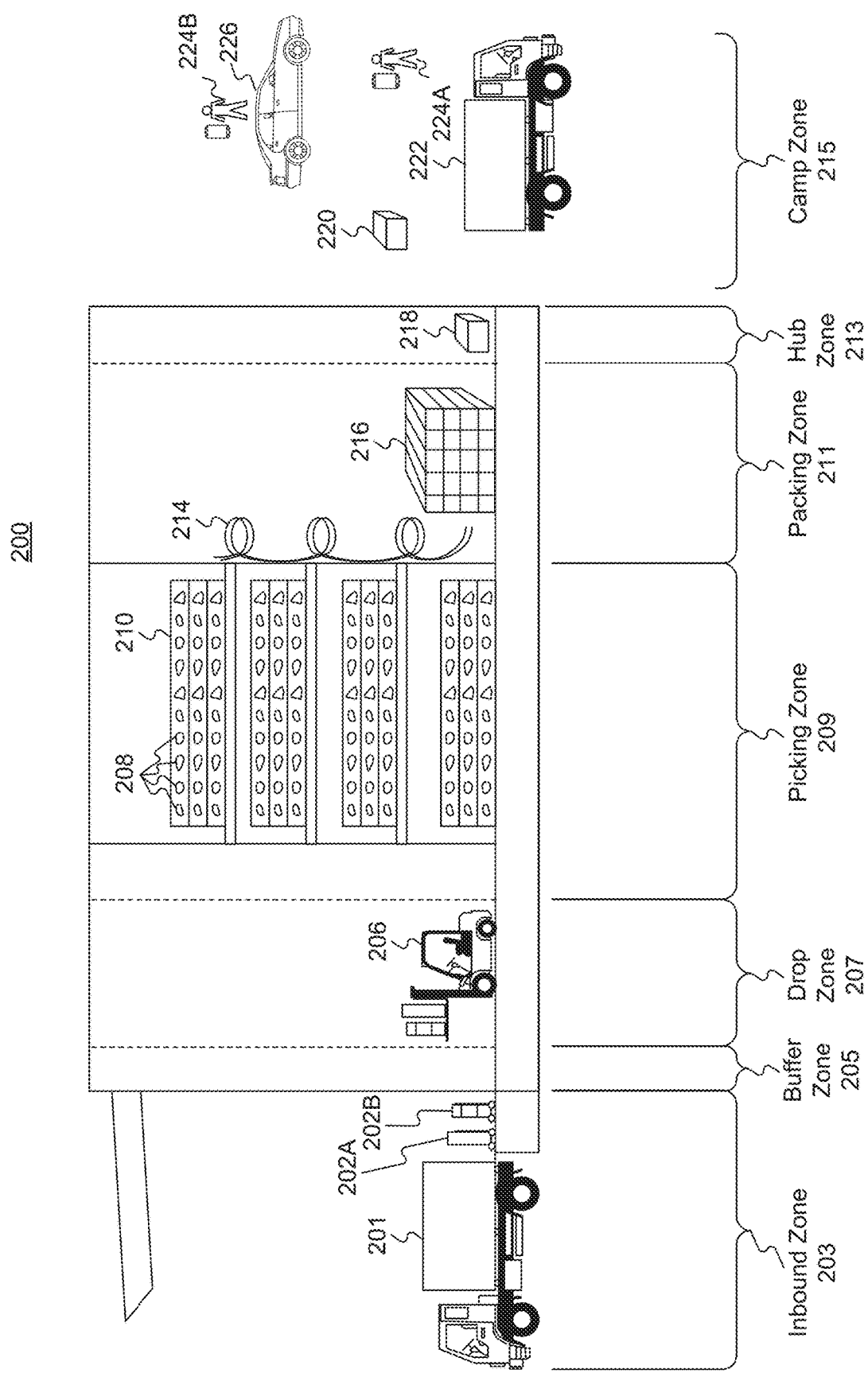
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Controlled testing may be the performance of tests or experiments in which one or more variable groups are tested along with a control group. The control group may represent a default state, an initial state, or any state that is not being varied in the test or experiment, to which a varied state is being compared. Variable group may represent a state which is being varied from the control group. A/B testing may be a type of controlled testing in which only a single variable is present. In some embodiments, A/B testing may be preferable owing to the simplicity of only analyzing a single variation. In some embodiments, controlled testing, such as A/B testing, may be deployed to test an efficacy of a computer system or its subsystems between two different versions, features or implementations. For example, a version may be a variable group A, and an alternative version may be a variable group B. When both variable group A and variable group B are implemented, the data that is generated may be monitored or collected. In some instances, various metrics may be used to measure the data generated, and based on the metrics and rules of the testing, results may be generated. In some embodiments, the data generated during the testing are referred to as "events."

According to some embodiments, the A/B testing may be related to a computer system having interactive features used by users. Interactive features may include features that allow the system to generate output to or receive input from users. For example, outputs may include graphic user interfaces (GUI), images, videos, texts, and/or sounds. Inputs may include user inputs via keyboard, mouse, touch screen, sound or image captured via audio or video devices, and/or any actions or inaction that may be received by the system. By way of a non-limiting example, system 100 may be a computer having interactive features. External front end system 103 may generate non-limiting examples of interactive displays illustrated in FIG. 1B-1E as outputs to users through devices 102A and 102B. External front end system 103 may also receive user interactions with the outputs through devices 102A and 102B. System 100 may receive and collect user actions when users, for example, browse, view, select, purchase, reject, leave, or perform any other action through the interactive displays. In some embodiments, user interaction may result in shipments of goods from one or more fulfillment centers, such as FC 200 illustrated in FIG. 2.

Figure 3:
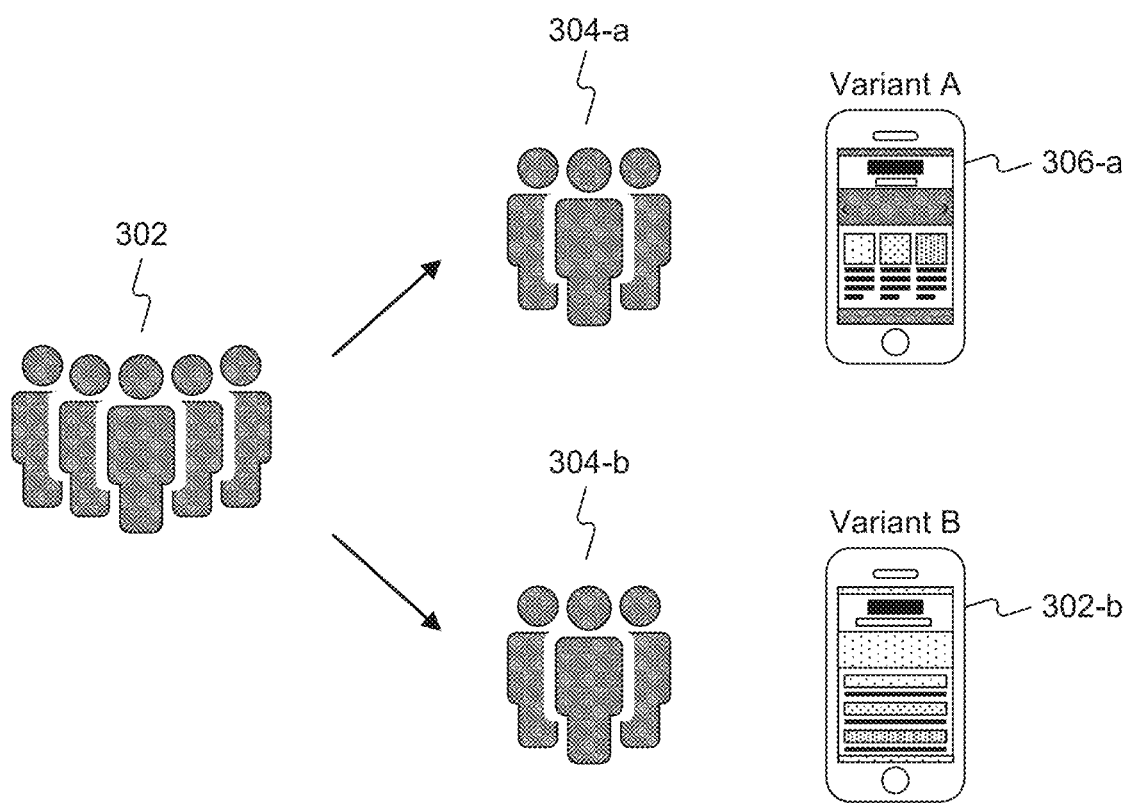
FIG. 3 depicts a schematic diagram of an exemplary A/B test, consistent with the disclosed embodiments.

FIG. 3 provides a simplified example of a generic A/B test, such as test 300. Users 302 may be divided into group 304-a and group 304-b. In some embodiments, users 302 are divided into the groups at random. In some other embodiments, users 302 may be grouped based on some predetermined or dynamic conditions. For examples, conditions may include characteristics of the user, such as age, sex, geographic regions, activity history, habits, purchasing pattern, income, interaction type, income, market segments, and/or other relevant user segmentations. In some embodiments, group 304-a is directed to interact with variant A 306-a, while the group 304-b is directed to interact with variant B 306-b. A variable or variant may represent a feature of the system that is being tested (e.g., being varied from the control). In some embodiments, variant B 306-b may differ from variant A 306-a in at least one aspect. In some embodiments, variant A 306-a and variant B 306-b may relate to system 100. For example, features tested may be one of display generated by external front end system 103, such as ones illustrated in FIG. 1B-1E, which may be presented to users 302 through one more user devices. In some instances, an existing version of FIG. 1B-1E may be displayed to some users, these users forming group 304-a. The existing version of FIG. 1B-1E may be variant A 306-a. Some alternative version of the displays may be displayed to the group 304-b. The alternative version of display may be variant B 306-b. For example, variant A version of FIG. 1B-1E may differ from variant B version in listing of product items, order of listing of the product items, display features such as color, font, size, images, videos, and/or arrangement of these features. An ordinary skilled person will appreciate that any features that can be altered, removed, or newly added to system 100 may be tested as a variable.

Test 300 may produce test data. In some embodiments, in context of controlled test relating to user interactions exemplified in FIG. 3, the test data may be referred to as "events." These events may be processed and analyzed to produce results relevant to the improvement and optimization of system 100. In some embodiments, the events are analyzed and in an experiment platform engine.

Figure 4:
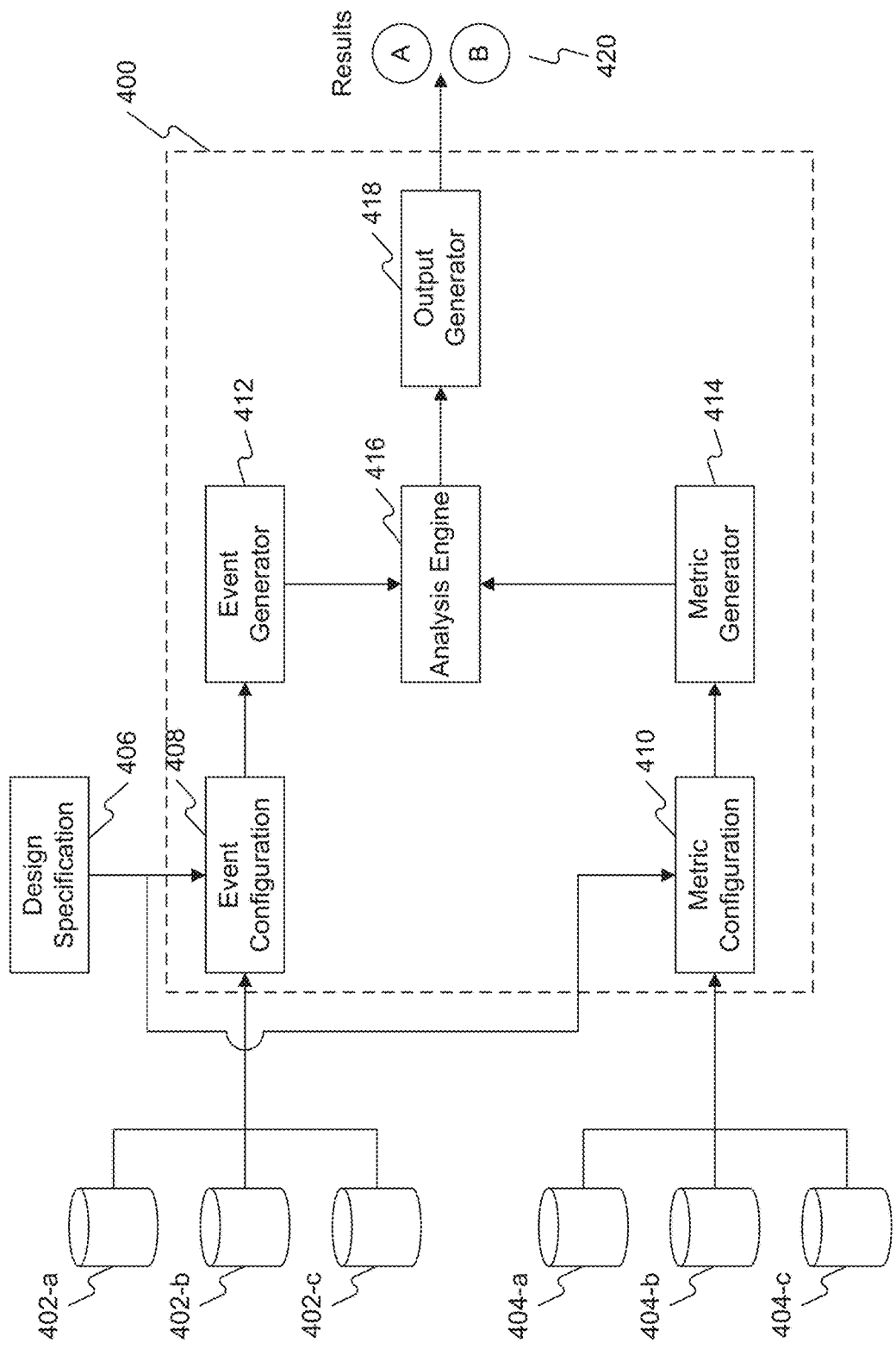
FIG. 4 depicts a schematic diagram of an exemplary experiment platform engine, consistent with the disclosed embodiments.
Figure 5:
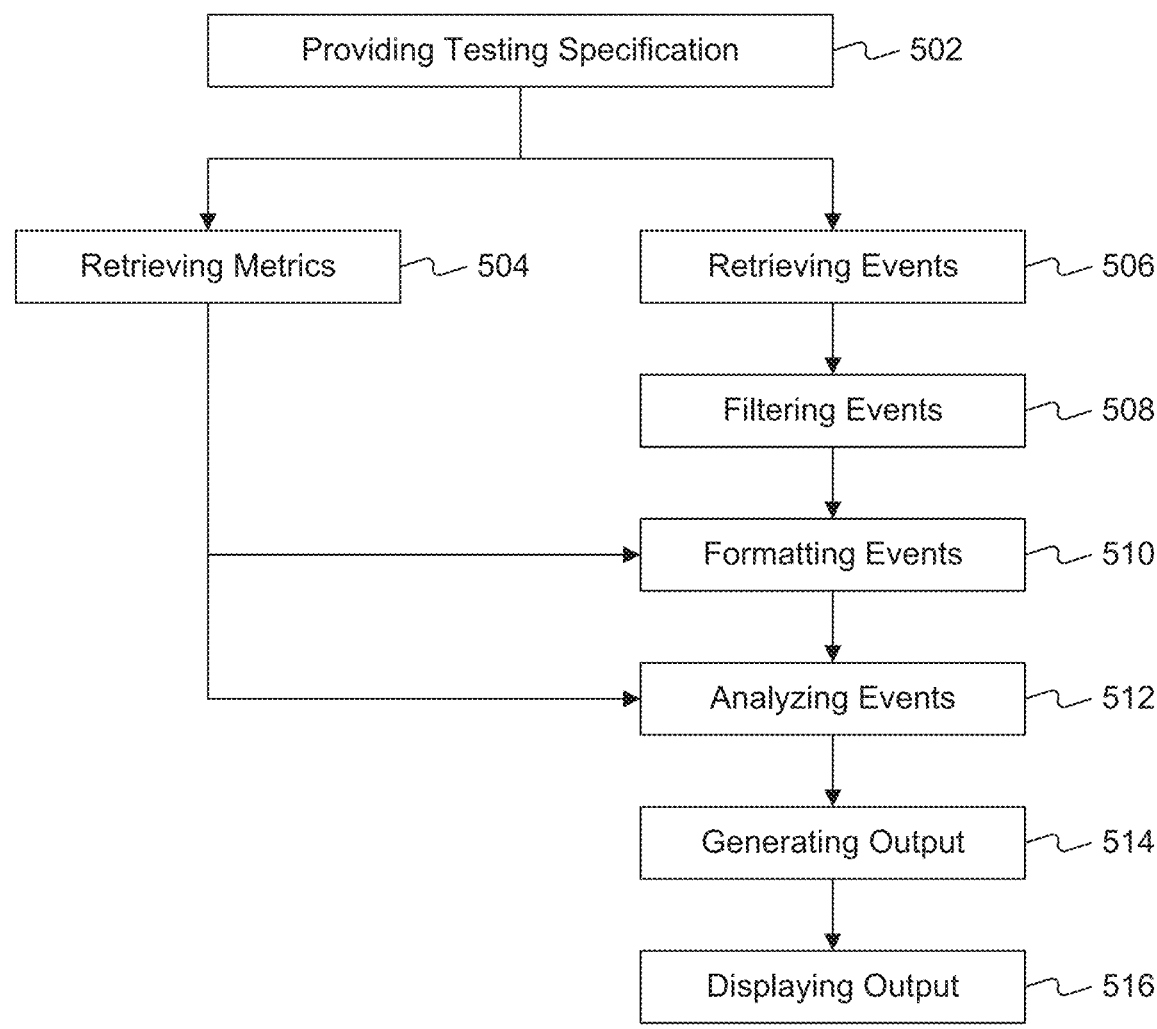
FIG. 5 depicts a flow chart of an exemplary process of an experiment platform engine, consistent with the disclosed embodiments.

An experiment platform engine may be a computer system for processing, analyzing, generating, and outputting events and results of a controlled test (e.g., an A/B test). By way of example, FIG. 4 illustrates a non-limiting example of an experiment platform engine (XPE) 400 and its operation process, consistent with the disclosed embodiments. FIG. 5 depicts a flow chart of an exemplary process of an experiment platform engine, consistent with the disclosed embodiments. In some embodiments, various submodules of XPE 400 may be configured to perform the steps of process 500.

According to some embodiments, design specification 406 defines various parameters of a controlled test to be analyzed by XPE 400. Examples of the various parameters may include, but not limited to, event sources, metric sources, event configuration, metric configuration, testing rules, and output rules. In some embodiments, design specification 406 may be a standardized file or other formats of computer codes readable by a computer system. In some embodiments, design specification 406 is related to test 300.

Events may be generated in test 300 and may be stored on in one or more memory storage, which may serve as sources of events for XPE 400. Event source 402-a, 402-b, and/or 402-c may be examples of memory storage containing events. In some embodiments, event configuration 408, based on parameters specifies in design specification 406, prepares events needed for XPE 400. In general, within an organization, a large number of controlled tests may be carried out for different systems, or for the same system. The particular set of events needed to analyze a particular controlled test by XPE 400 may need to be retrieved from the corresponding event sources. Event configuration 408, based on the parameters defined by design specification 406, identifies and retrieves the events needed. In some embodiments, one or more of the event sources 402-a, 402-b, and/or 402-c may be identified by event configuration 408 as containing the particular set of events needed. In some embodiments, events retrieved may require additional processing, such as filtering or formatting. Event configuration 408 may determine, based on design specification 406, the specific filtering and formatting that may be required by XPE 400 to analyze the retrieved events.

In some embodiments, metrics may comprise algorithms, logics, or formulas for manipulating events in order to produce some results. Examples of metrics may include addition, subtraction, multiplication, division, summation, integration, comparison, Boolean operation, and/or any other data logics or operations. In some non-limiting example, if an event is a sale of a product item, a metric may be a summation operation that sums all events (e.g., sales) to obtain a total amount of product sold. In some embodiments, metrics may be stored in metric sources 404-a, 404-b, and/or 404-c, and retrievable by metric configuration 410. In some embodiments, metric configuration 410 retrieves the appropriate metrics for XPE 400 based on parameters of design specification 406.

Event generator 412 outputs events for analysis based on selections and rules determined in event configuration 408. Metric generator 414 provides metrics used to analyze events provided by event generator 412. In some embodiments, event generator 412 and/or metric generator 414 may employ algorithms known in the art to copy, transfer, retrieve, format, truncate, sort, and/or otherwise manipulate events and/or metrics. The selections and rules may include event sources, ranges for filtering, and/or formatting for events.

Analysis engine 416 applies the metrics to the events. In some embodiments, applying the metrics may include executing one or operations, such as algorithms, logics, or formulas, associated with the metrics. By way of example, if a metric is a summation operation, and an event represent a single instance of user action, applying the summation operation to the events may include summing all instances of user action to produce a result of the total number of user actions.

Output generator 418 applies output rules and/or testing rules to results produced by analysis engine 416. In some embodiments, output rules may be designated by design specification 406, and may govern the various aspects of output 420. For example, results by analysis engine 406 may be formatted into to file formats known in the art, such as plain text, comma-separated values (CSV), Microsoft Excel, or other suitable data format. In other examples, output 420 may include one or more visual representations, such as graphs or charts, which may be generated based on the results produced in analysis 416.

Testing rules may be designated by design specification 406. Testing rules may include application of statistical methods to the results of analysis engine 416. Statistical methods may include statistical hypothesis tests, such as, P-value, confidence interval, minimum detectable difference (MDE), and other numerical or qualitative valuations, to determine what, if any, differences in results may exist between variant A 306-*a* and 306-*b*.

In some embodiments, event configuration 408 may determine the event source, filter and/or format dynamically based on some algorithms of XPE 400 or provided by design specification 402. Versatility of XPE 400 may depend on whether it may be adapted for use for different controlled tests. Each different test may have events stored in different event sources, different ranges to be filtered, or different metrics requiring different formatting. If, for example, extensive modification is required when XPE 400 analyzes different controlled tests, the efficiency and versatility of XPE 400 may be limited. Moreover, even for the same controlled test, there may be instances that segmented results are desired, hence events may need to be segmented and analyzed separately. Therefore, efficiency and utility of XPE 400 may be increased if manipulation of events can be automated by XPE 400. For example, event configuration 408 may increase the throughput of XPE 400 by enabling many concurrent analyses to be performed in parallel that may require different sets of events, or segments of events, without requiring extensive modification of XPE 400. Moreover, by reducing the amount of modification required to manipulate events for XPE 400, cost in time and labor of using XPE 400 may be reduced, allowing for more test data to be analyzed or re-analyzed.

FIG. 5 illustrates a flow chart depicting process 500, a non-limiting example of the operation of the XPE 400, consistent with the disclosed embodiments.

In step 502, design specification 406 is provided to XPE 400. In some embodiments, design specification 406 may be a standardized design documents having instructions readable and executable by XPE 400. In some embodiments, XPE 400 may be connected to devices having user interfaces, and design specification 406 may be provided to XPE 400 via a user interface.

In step 504, metric generator 414 retrieves metrics based on design specification 406. The metrics may be retrieved from one or more of metric sources 404-*a*, 404-*b*, and/or 404-*c*. In some embodiments, design specification 406 may designate the particular metrics to be retrieved, and/or the particular metric sources. In some embodiments, metric configuration 410 may determine the particular metrics and/or the particular metric sources based on design specification 406 without being specifically designated by design specification 406. For example, metric configuration 410 may automatically determine, based on parameters contained in design specification 406, that a particular controlled test may require a particular set of metrics stored in particular metric sources.

In step 506, event generator 412 retrieves events based on design specification 406. The events may be retrieved from one or more of event sources 402-*a*, 404-*b*, and/or 404-*c*. In some embodiments, design specification 406 may designate the particular events to be retrieved, and/or the particular event sources. In some embodiments, event configuration 408 may determine the event sources without being specifically designated by design specification 406. For example, events corresponding to a particular controlled test may be indexed and stored in specific event sources based on some predetermine rules. event configuration 408 may identify, based on the predetermined rules, the event sources for the particular controlled test.

In step 508, event generator 412 filters the events retrieved in step 506. It may be desirable to analyze and provide results of a controlled test in segments so that additional insight may be gained from the results. Additionally or alternatively, only portions of the events may be relevant to a desirable goal, and thus analysis of the irrelevant portions may be a waste of system resources. By filtering the events, event generator 412 may divide the retrieved events into segments for separate analysis, and prevent unnecessary use of system resources on irrelevant data.

For example, events may be filtered based on a testing period. A controlled test may have taken place over a total period of time. The events associated with the controlled test may be divided over segments of the total period of time. It may be desirable to observe results over time, thus events may be segmented into smaller increments of the total time period. Events of a controlled test taking place over a year, for example, may be divided into segments of months, week, and so forth. In this example, if results of interest are for the month of April, event generator 412 may filter for only the events of April.

In another example, results of a controlled test may be analyzed based on some characteristics of the users 302. In some embodiments, one or more characteristics of users 302 may be tracked as events are generated in the controlled test. The characteristics may be based on, but not limited to, age, sex, geographic regions, activity history, habits, purchasing pattern, income, interaction type, income, market segments, and/or other relevant segmentations that may characterize users 302. For example, it may be desirable to analyze how interactions may differ based on geographic region, which may correspond to a relevant market division. event generator 412 may filter the events into segments based on the location of each of user 302, thus allowing analysis engine 416 to perform analysis for each segment individually.

In yet another example, results of a controlled test may contain events of different data types. In some embodiments, during the controlled test, multiple data types of events are being generated and collected, and each data type may require different metrics to analyze. Moreover, events may be segmented based on the data types for different analysis. For example, the controlled test of an element of the web-page may collect events in forms of mouse click, page refresh, view count and/or view time. event generator 412 may segment the events by filtering for one or more data types for analysis.

In some embodiments, design specification 406 may provide instruction to event configuration 408 for determining filtering of the retrieved events. For example, design specification 406 may designate desired segmentations range and type. In some embodiments, event configuration 408 may determine based on some predetermined rules, the filtering required for the retrieved events.

In step 510, events filtered in step 508 may be formatted such that the events may be compatible with metrics retrieved in step 504. In some embodiments, design specification 406 may designate formatting for the events. In some embodiments, event configuration 408 may determine based on a formatting requirement of the retrieved metrics. For example, each metric may be associated with one or more formatting rules, and events may be formatted based on the formatting rules associated with the retrieved metrics.

In step 512, analysis engine 416 analyzes the formatted events from steps 510 using the retrieved metrics from step 504. In some embodiments, the metrics operate on the events and produce results.

In step 514, output generator 418 generates output using results obtained in step 512. In some embodiments, design specification may designate testing rules that further analyze the results in order to generate output. Testing rules may include comparing the results between variant A 306-*a* and variant B 306-*b*. For example, output generator 418 may perform further analysis to see what, if any, differences in results may exist between variant A 306-*a* and 306-*b*. In some embodiments, statistical analysis may be employed to analyze the comparison between the results of variant A 306-*a* and 306-*b* to measure statistical significance. Examples of statistical analysis include differences in value, differences in percentage, P-value, confidence interval, minimum detectable difference (MDE), and other numerical or qualitative valuations relevant to the controlled test. In some embodiments, the graphical representations of the statistical analysis may be generated for ease of viewing. In some embodiments, the testing rules may be stored in one or more memory storage, and design specification 406 may direct XPE 400 to retrieve the testing rules.

Figure 6:
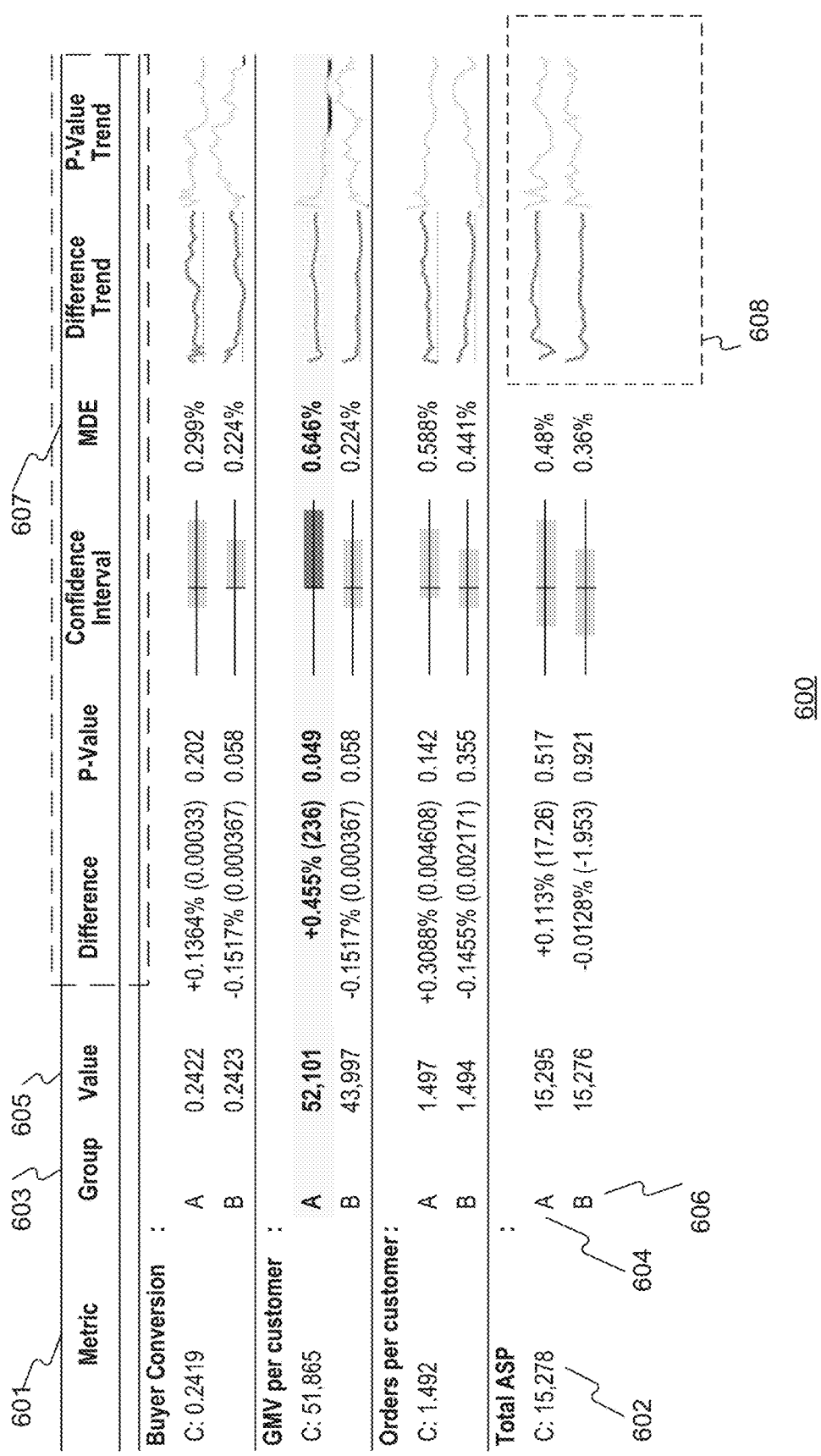
FIG. 6 depicts an exemplary user interface, consistent with the disclosed embodiments.

In step 516, output generator 418 may provide the output generated in step 514 for display in a user interface. By way of example, FIG. 6 depicts an exemplary user interface, consistent with the disclosed embodiments. Display 600 may be displayed on output devices, such as devices 107A-C, 119A-C, or some other mobile or computing devices. Display 600 includes interfaces 601, 603, 605, 607, and 608. Interface 601 contains metrics relevant to a controlled test, such as "Buyer Conversion," "GMV per Customer," "Orders per Customer," and "Total ASP." Interface 603 contains the different variant groups in the controlled test. Interface 605 contains values of the different metrics shown in interface 601 for the variant groups and/or a control. In some embodiments, the values shown in interface 605 may be results produced by analysis engine 416 in step 512. For example, in the "Total ASP" metric, there may be three different values displayed. 602 represents the values for a controlled group, while 604 and 606 may represent values of variant group A and variant group B, respectively. Interface 607 depicts the results different statistical analysis produced by output generator 418 in step 514. In some embodiments, the results different statistical analysis may be presented in graphical or chart form, such as shown in interface 608.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computerized method for controlled testing, comprising:
   providing a design specification for event data, the design specification including one or more sources of testing metrics;
   retrieving testing metrics from the one or more sources of testing metrics, each testing metric being associated with one or more event data format rules;
   configuring testing events based on the design specification, by:
      retrieving one or more testing events from an event data source;
      filtering the retrieved testing events into segments;
      formatting the segments based on the design specification; and
      determining whether to filter the retrieved testing events based on a testing period, wherein the operations further comprise:
         determining whether a controlled test occurred;
         upon determining a controlled test occurred, analyzing results of the controlled test based on at least one of user characteristics of at least one user or a geographic region associated with the controlled test;
         segmenting the results of the controlled test based on predetermined event data types; and
         generating an analysis of the controlled test data;
   generating analysis data by applying the testing metrics to the configured testing events;
   generating a comparison between the configured testing events and the controlled test data;
   generating output data based on testing rules and the comparison; and
   generating a user interface to display the output data.

2. The method of claim 1, wherein the design specification is a standardized design document.

3. The method of claim 1, wherein the design specification further includes one or more event data sources.

4. The method of claim 3, wherein the event data source is specified in the design specification.

5. The method of claim 1, wherein the design specification further includes one or more event data filters.

6. The method of claim 5, wherein filtering the retrieved testing events comprising filtering the retrieved testing events based on at least one of the one or more event data filters.

7. The method of claim 1, wherein the user characteristics comprise age, sex, activity history, habits, purchasing patterns, income, interaction type, or income market segments.

8. The method of claim 1, wherein:
the design specification further specifies sources of testing metrics; and
retrieving the testing metrics comprises retrieving the testing metrics from specified testing metrics sources.

9. The method of claim 1, wherein:
the design specification designates a testing region; and
filtering the retrieved testing events include filtering the testing events based on the testing region.

10. The method of claim 1, wherein:
the design specification designates an event data type; and
filtering the retrieved testing events include filtering the testing events based on the event data type.

11. The method of claim 1, wherein:
at least one of the testing metrics is associated with one or more event data format rules; and
formatting the filtered testing events include applying to the at least one of the testing metrics to the filtered testing events.

12. The method of claim 11, wherein the one or more event data format rules are retrieved from the specified testing metrics sources.

13. The method of claim 1, wherein:
the design specification further includes one or more output rules; and
generating output data comprises generating a segmented output data, based on the one or more output rules.

14. A system for controlled testing, comprising:
a user interface;
a memory storing instructions; and
at least one processor configured to execute the instructions to perform operations comprising:
providing a design specification for event data, the design specification including one or more testing metrics, each testing metric being associated with one or more event data format rules;
configuring testing events based on the design specification, by:
retrieving one or more testing events from an event data source;
filtering the retrieved testing events into segments;
formatting the segments based on the design specification; and
determining whether to filter the retrieved testing events based on a testing period, wherein the operations further comprise:
determining whether a controlled test occurred;
upon determining a controlled test occurred, analyzing results of the controlled test based on at least one of user characteristics of at least one user or a geographic region associated with the controlled test;
segmenting the results of the controlled test based on predetermined event data types; and
generating an analysis of the controlled test data;
generating analysis data by applying the testing metrics to the configured testing events;
generating a comparison between the configured testing events and the controlled test data;
generating output data based on testing rules and the comparison; and
generating a user interface to display the output data.

15. The system of claim 14, wherein the design specification is a standardized design document.

16. The system of claim 14, wherein the event data source for retrieving the one or more testing events is specified in the design specification.

17. The system of claim 14, wherein:
the design specification further includes one or more event data filters; and
filtering the retrieved testing events comprising filtering the retrieved testing events based on at least one of the one or more event data filters.

18. The system of claim 14, wherein the user characteristics comprise age, sex, activity history, habits, purchasing patterns, income, interaction type, or income market segments.

19. The system of claim 14, wherein:
the design specification further specifies sources of testing metrics; and
retrieving the testing metrics comprises retrieving the testing metrics from specified testing metrics sources.

20. The system of claim 14, wherein:
the design specification designates a testing region; and
filtering the retrieved testing events include filtering the testing events based on the testing region.

* * * * *